(12) United States Patent
Grantz et al.

(10) Patent No.: US 6,702,465 B2
(45) Date of Patent: Mar. 9, 2004

(54) EXCLUSION SEAL FOR FLUID DYNAMIC BEARING MOTORS

(76) Inventors: Alan Lyndon Grantz, 7330 Viewpoint Rd., Aptos, CA (US) 95003; Robert Alan Nottingham, 1816 Hector La., Santa Cruz, CA (US) 95062; Jeffry Arnold LeBlanc, 6565 Oakridge Rd., Aptos, CA (US) 95003; Troy Michael Herndon, 1508 Jarvis Ct., San Jose, CA (US) 95118; Norbert Steve Parsoneault, 130 Zinfandel Cir., Scotts Valley, CA (US) 95066; Saul Ceballos, 816 Vermont St., Watsonville, CA (US) 95076; Hans Leuthold, 1238 Escalona Dr., Santa Cruz, CA (US) 95060; Alexander Gredinberg, 1981 Catrina Ct., San Jose, CA (US) 95124

( * ) Notice: Subject to any disclaimer, the term of this patent is extended or adjusted under 35 U.S.C. 154(b) by 29 days.

(21) Appl. No.: 10/017,196

(22) Filed: Dec. 13, 2001

(65) Prior Publication Data
US 2003/0030222 A1 Feb. 13, 2003

Related U.S. Application Data
(60) Provisional application No. 60/312,166, filed on Aug. 13, 2001.

(51) Int. Cl.⁷ .............................................. F16C 32/06
(52) U.S. Cl. ...................................................... 384/110
(58) Field of Search ................................ 384/110, 100, 384/107, 119, 132, 133; 360/99.08

(56) References Cited

U.S. PATENT DOCUMENTS

| | | | | |
|---|---|---|---|---|
| 5,246,294 A | * | 9/1993 | Pan ............................. 384/119 |
| 5,559,651 A | * | 9/1996 | Grantz et al. ............ 360/99.08 |
| 5,697,708 A | * | 12/1997 | Leuthold et al. ............ 384/110 |
| 6,118,620 A | * | 9/2000 | Grantz et al. ............ 360/99.08 |
| 6,144,523 A | * | 11/2000 | Murthy et al. ........... 360/99.08 |
| 6,148,501 A | | 11/2000 | Grantz et al. ............ 29/603.03 |
| 6,154,339 A | * | 11/2000 | Grantz et al. ............ 360/99.08 |

* cited by examiner

Primary Examiner—Thomas R. Hannon
(74) Attorney, Agent, or Firm—James A. Sheridan (57) ABSTRACT

A method and apparatus for a conical bearing is provided having a seal shield having an angle supported from the hub or sleeve which surrounds the shaft, and extending at an angle toward the outer surface of the shaft and spaced slightly away from the upper angular surface of the cone. As the cone and seal shield rotate relative to one another, fluid is drawn toward the lower inner region of the reservoir. However, due to shock or the like, some fluid may reach the radial gap between the end of the shield and the outer surface of the shaft, therefore, a ring is either incorporated into the upper end of the cone or pressed against the axial outer end of the cone, defining an axial gap which is smaller than the radial gap. In a preferred form of the invention, the ratio is about 1:3.

When oil is introduced to either of the two gaps (typically by shock), it transfers or typically comes to rest in the axial gap, since the capillary attractive force increases as the gap size decreases; therefore, with the axial gap being smaller than the radial gap the oil will tend to transfer to the axial gap. As the seal is spun up as the shield and cone rotate relative to one another, centrifugal force acting on the oil in the axial gap transfers the oil radially away from the radial gap and into the reservoir defined between the shield and the cone. This transfer typically happens in two stages. First the oil in the radial gap is transferred into the axial gap, typically in the first few seconds of operation. The oil remaining in the axial gap then transfers into the reservoir volume due to centrifugal pumping.

17 Claims, 5 Drawing Sheets

EXCLUSION SEAL FOR FLUID DYNAMIC BEARING MOTORS

CROSS-REFERENCE TO RELATED APPLICATIONS

This application claims benefit of U.S. provisional patent application Ser. No. 60/312,166, filed Aug. 13, 2001, entitled "Exclusion Seal for FDB Motors" by Alan Grantz et al.; the application is incorporated herein by reference.

BACKGROUND OF THE INVENTION

1. Field of the Invention

The invention relates generally to the field of fluid dynamic bearings, and more specifically the present invention relates to apparatus for preventing the loss of fluid from a fluid dynamic bearing motor.

2. Description of the Related Art

Disc drive memory systems have been used in computers for many years for storage of digital information. Information is recorded on concentric tracks of a magnetic disc medium, the actual information being stored in the forward magnetic transitions within the medium. The discs themselves are rotatably mounted on a spindle, while the information is accessed by read/write has generally located on a pivoting arm which moves radially over the surface of the rotating disc. The read/write heads or transducers must be accurately aligned with the storage tracks on the disk to ensure proper reading and writing of information.

During operation, the discs are rotated at very high speeds within an enclosed housing using an electric motor generally located inside the hub or below the discs. Such known spindle motors typically have a spindle mounted by two ball bearings systems to a motor shaft disposed in the center of the hub. The bearings are spaced apart, with one located near the top of the spindle and the other spaced a distance away. These bearings allow support the spindle or hub about the shaft, allow for a stable rotational relative movement between the shaft and the spindle or hub while maintaining accurate alignment of the spindle and shaft. The bearings themselves are normally lubricated by highly refined grease or oil.

The conventional ball bearing system described above is prone to several shortcomings. First is the problem of vibration generated by the balls rolling on the bearing raceways. Ball bearings used in hard disc drive spindles one of the conditions that generally guarantee physical contact between raceways and balls, this in spite of the lubrication provided by the bearing oil or grease. Hence, bearing balls running on the generally even and smooth, but microscopically uneven and rough raceways, transmit the rough surface structure as well as their imperfections in sphericity in the vibration of the rotating disc. This vibration results in misalignment between the data tracks and the read/write transducer. This source of vibration limits, therefore, the data track density and the overall performance of the disc drive system. This vibration results in misalignment between the data tracks and the read/write transducer. This source of vibration limits therefore the data track density and the overall performance of the disc drive system.

Further, mechanical bearings are not always scalable to smaller dimensions. This is a significant drawback, since the tendency in the disc drive industry has been to continually shrink the physical dimensions of the disc drive unit.

As an alternative to conventional ball bearing spindle systems, much effort has been focused on developing a fluid dynamic bearing. In these types of systems lubricating fluid, either gas or liquid, functions as the actual bearing surface between a stationary shaft aft supported from the base of the housing, and the rotating spindle or hub. Liquid lubricants comprising oil, more complex ferromagnetic fluids, or other lubricants have been utilized in such fluid dynamic bearings. The reason for the popularity of the use of such fluids is the elimination of the vibrations caused by mechanical contact in a ball bearing system, and the ability to scale the fluid dynamic bearing to smaller and smaller sizes.

An issue which requires constant consideration in the design of a fluid dynamic bearing is preventing the loss of fluid from the bearing. Such loss can occur either due to evaporation, or to a high level shock to the bearing. One of the more popular types of fluid dynamic bearings is a conical bearing, wherein a general conical shape piece is attached or supported at or near the ends of the shaft to support a spindle or hub for rotation. The fluid bearing is provided between an angled surface on the conical piece and a facing surface on the spindle or hub; and a reservoir is provided at the outer end of the conical piece, defined by a seal shield which is supported from the hub or sleeve and extends generally radially toward the shaft. The inner surface of the seal shield and outer surface of the conical piece are designed to define both the reservoir and a centrifugal capillary seal at the outer end of the bearing. This seal is designed to utilize capillary attractive force to retain the oil or fluid within the reservoir during non-operating shock and vibration events. The shock retention capability of this seal is approximately 250Gs. When the shock levels exceed 250Gs, oil can leave the main body of the reservoir, and become trapped in the space which must be provided between the outer surface of the shaft and the end surface of the shield, called the annulus. This in itself is not necessarily a problem; but at shock levels somewhere in access of 250–300Gs, but typically below 500Gs, oil trapped in the annulus can be ejected and contaminate the disc drive. As the demands on shock resistance are increased, a greater level of ability to retain all the fluid in the fluid dynamic bearing at higher shock levels is increasing. Therefore, a robust, easy to assemble solution to the problem of potential fluid loss from a conical fluid dynamic bearing, one that also does not require any significant redesign of the known conical bearing and centrifugal capillary seal is highly desirable.

SUMMARY OF THE INVENTION

It is an object of the present invention to provide a hydrodynamic bearing design with increased resistance to loss of the lubricating fluid.

It is a further objective of the invention to provide an improved design for a conical bearing which utilizes a centrifugal capillary seal at the outer end for fluid retention.

It is a further objective of the invention to provide apparatus which minimizes the amount of oil which can reach and become trapped in the radial gap.

It is a further objective of the invention to provide a modified design of the capillary seal which provides for active pumping to remove oil which is lodged in the annulus. In another objective of the present invention is to provide a modified design of fluid bearing and the seal which makes it more difficult for oil, having reached the radial gap or annulus, to be expelled from that annulus into the interior of the disc drive.

In summary, according to the present invention a conical bearing is provided having a seal shield having an angle supported from the hub or sleeve which surrounds the shaft, and extending at an angle toward the outer surface of the shaft and spaced slightly away from the upper angular surface of the cone. As the cone and seal shield rotate relative to one another, fluid is drawn toward the lower inner region of the reservoir. However, due to shock or the like, some fluid may reach the radial gap between the end of the shield and the outer surface of the shaft, therefore, a ring is either incorporated into the upper end of the cone or pressed against the axial outer end of the cone, defining an axial gap which is smaller than the radial gap. In a preferred form of the invention, the ratio is about 5:1.

When oil is introduced to either of the two gaps (typically by shock), it transfers or typically comes to rest in the axial gap, since the capillary attractive force increases as the gap size decreases; therefore, with the axial gap being smaller than the radial gap the oil will tend to transfer to the axial gap. As the seal is spun up as the shield and cone rotate relative to one another, centrifugal force acting on the oil in the axial gap transfers the oil radially away from the radial gap and into the reservoir defined between the shield and the cone. This transfer typically happens in two stages. First the oil in the radial gap is transferred into the axial gap, typically in the first few seconds of operation. The oil remaining in the axial gap then transfers into the reservoir volume due to centrifugal pumping.

A simplified method of positioning the ring comprises placing the ring on the shaft between the cone and the shield. The ring is put in final position relative to the shield by pressing on the outer end of the shield with a known force, deflecting the shield a calculated distance and moving the ring accordingly.

Other features and advantages of the invention will be apparent to a person of skill in the art who studies the teachings of a exemplary embodiment given in detail below when conjunction with the accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Figure 1:
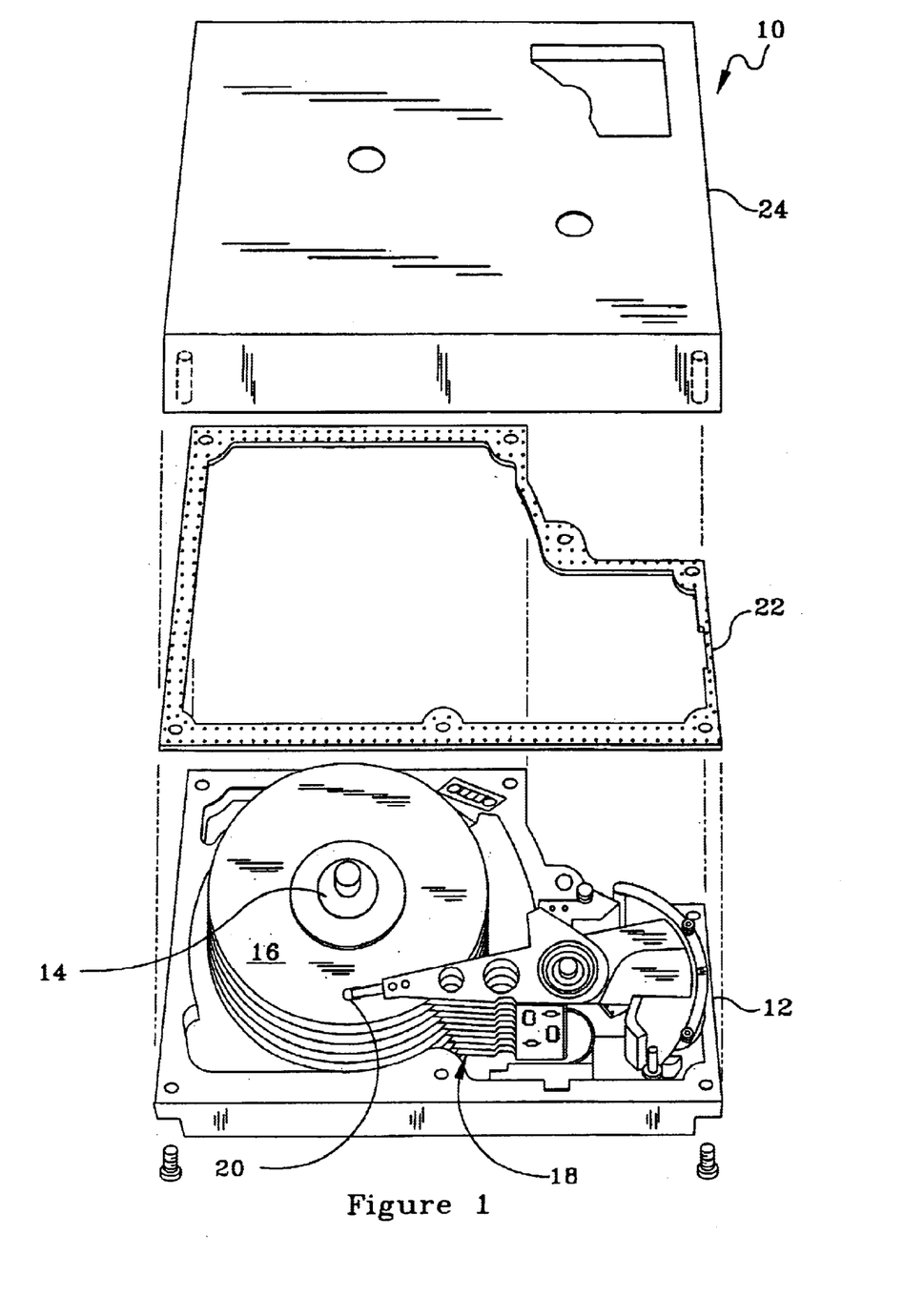
FIG. 1 is a perspective view of a disc drive in which this invention is useful.

FIG. 1 is an exploded perspective view of a magnetic disc drive storage system in which the present fluid dynamic bearing could be used. In the example to be discussed below, the use of the fluid dynamic bearing will be shown in conjunction with a spindle motor. However, this bearing cartridge is not limited to use with this particular design of a disc drive, which is shown only for purposes of the example. Given the stability which this invention achieves, it could also potentially be used to support the actuator for rotation. The bearing cartridge also has numerous other uses outside the field of disc drives.

In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain each transducer flying over the surface of the associated disc. In present day technology, the spacing distance between the transducer and the rotating disc surface is measured in microinches; thus it is absolutely essential that the disc does not tilt or wobble.

Figure 2:
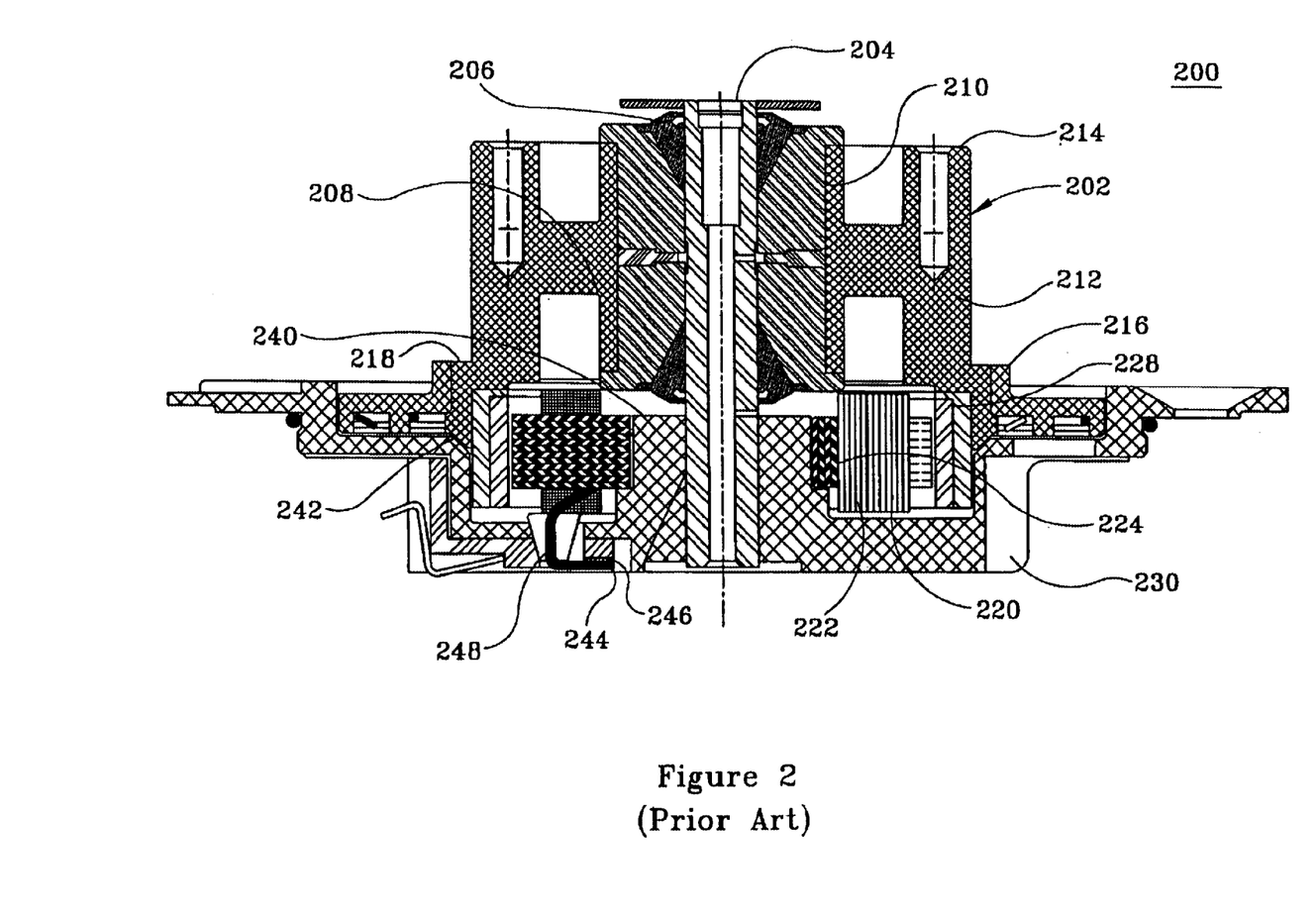
FIG. 2 is a vertical sectional view of a motor in which the present invention is useful.

FIG. 2 is a vertical sectional view of a known spindle motor including a set of conical hydrodynamic bearings 206, 208 which should support the shaft 204 and the hub 202 for relative rotation. The motor is a brushless direct current motor 200 comprising a hub 202 rotatably mounted about the stationary shaft 204 by the upper and lower bearings 206 and 208 respectively. The hub 202 which supports one or more discs such as are shown in FIG. 1 for rotation is formed in a generally inverted U-shape as seen in cross section, and has an inner annular sleeve 210 and outer cylindrical surface 212 and a top portion 214. Outer cylindrical surface 212 includes a shoulder 216 for supporting a disc in a contaminant free environment which encloses the outer surface of the motor. A plurality of storage discs separated by spacers or washers may be stacked along the vertical length of outer cylindrical surface 212.

The interior portion of hub 202 operably receives a stator, generally designated 220, including a stator lamination stack 224 in stator windings 222. A permanent magnet 228 is mounted on a back iron 229 supported from an outer annular arm 218 for magnetically interacting with magnetically active stator lamination stack 224 and stator windings 222. It is to be understood that a plurality of permanent magnets segments may comprise the permanent magnet 226 in this design.

The disc drive motor 200 is mounted to a frame or base member 230 of disc drive assembly 200 by inserting member 231 in the recess in member 230.

Stator support 240 surrounds stationary shaft 204 and supports stator 220 in a substantially vertical position. Stator support 240 comprises a boss 242 formed in base plate member 230 which serves to maintain disc drive motor 200 in a spaced relation with respect to base member 230. The stator 220 is bonded to the base 230.

A circuit connector 244 is mounted to a lower surface of the base member 230. The circuit connector 244 is electronically connected to stator windings 222 by a wire 248 for electrical communication between the stator windings and a printed circuit board (not shown). By energization of this circuitry, control signals cause constant speed rotation of the hub about the shaft 204 as supported by the upper and lower conical bearings 206, 208.

Figure 3:
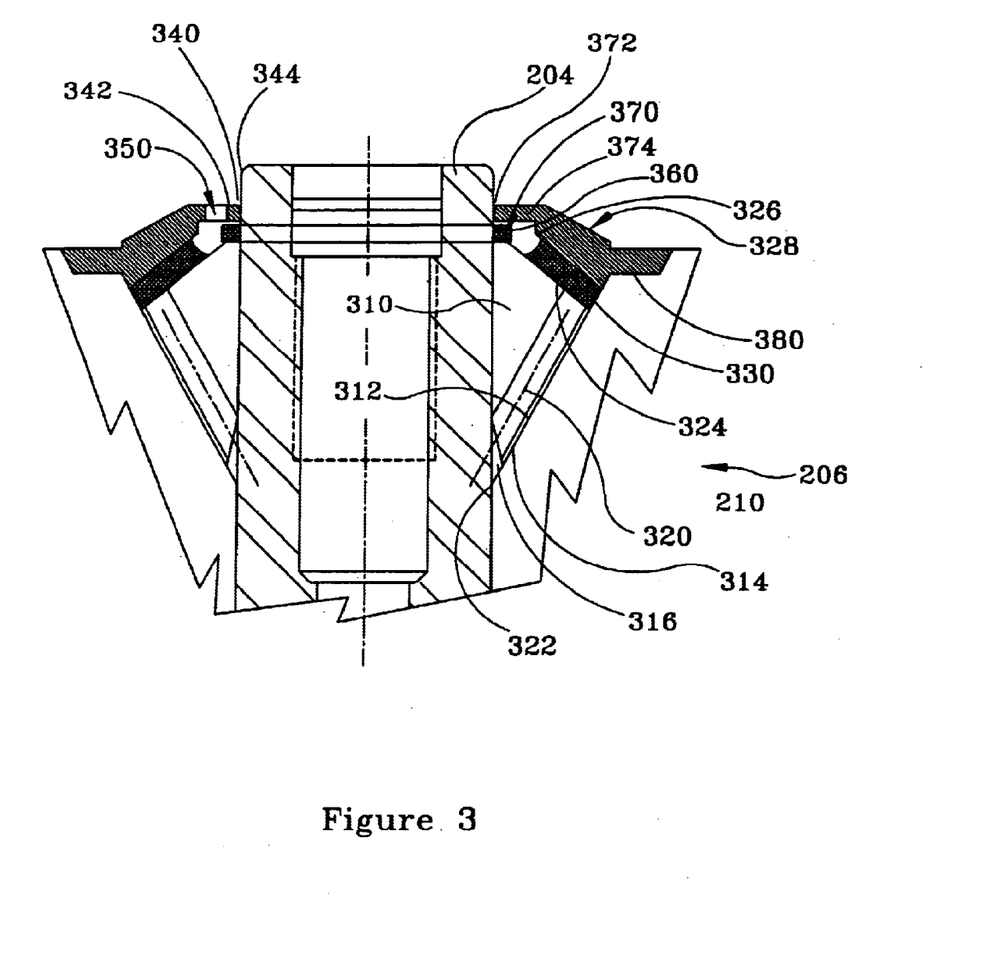
FIG. 3 is a partial sectional view of an embodiment of the present invention.

A partial sectional view of the shaft and conical seal combination referred to in FIG. 2 is shown in FIG. 3. In this figure, the shaft 204 is shown supporting the hub 210 utilizing a conical bearing 206 comprising a cone 310 supported on the outer surface of the shaft having a first angular surface 312 which cooperates with a surface 314 of the hub 210 to define a gap 316 filled with fluid. The fluid acts as a bearing to support relative rotation of the hub 210 and shaft 310. In order to keep fluid fully distributed over the first angular surface 314 of the cone, a return channel 320 is provided extending from the lower or distal end 322 of the cone to the upper angular surface 324 of the cone 310. This upper angular surface 324 cooperates with a facing angular surface 326 of the seal shield 328 to define a reservoir 330 which holds fluid at the end of the gap 316 and return channel 320 so that fluid is always available in the gap between the cone 310 and the hub 210. As the shield 328 and cone 310 rotate relative to one another, the oil is forced away from the radial gap 340 which is defined between the radial end 342 of seal 328 and the outer surface 344 of shaft 204.

The seal as described with respect to FIG. 3 is filled with the fluid 331 through a fill-hole 350. It is this fluid, especially as it resides in the gap between the angular surface 314 of hub 210 and the facing angular surface 312 of cone 310 which provides the bearing interface. As described above, once the fluid is filled into the reservoir, the design employs a centrifugal capillary seal to maintain the oil in the bearing. However, when a shock exceeds a certain level, then fluid can leave the main body of fluid 331 in the reservoir and become trapped in the radial gap between the shaft 204 and the shield 328. This gap or annulus 340 will hold the oil under many shock conditions and prevent its ejection into the surrounding atmosphere. However, it has been found that under certain shock and vibration events, the oil trapped in the annulus 340 can be ejected into the surrounding atmosphere where it could contaminate the disc drive. Therefore, the capillary seal of FIG. 3 has been modified to incorporate a ring of metal, plastic or the like, which is optimally located across a carefully spaced axial gap 370 from the seal shield 328. That is, the upper axially surface 372 of the seal ring 360 is spaced a known distance from the facing, substantially parallel surface 374 of the seal shield 328. By making this axial gap, with a functional width which is substantially smaller than the radial gap 340, then a seal can be created which uses a combination of capillary attraction and active pumping to remove oil which becomes lodged in the annulus or radial gap 340. By virtue of this axial gap 370 being substantially smaller than the radial gap 340, this also limits the amount of oil which can be introduced into the annulus during shock.

In summary, the seal to be described below comprises means for preventing oil from leaving the reservoir area 330 through the annulus 340 between the shaft and the shield under high shock conditions as well as normal operating conditions. In addition, should oil enter the annulus 340 between the shield 328 and the shaft 204, the exclusion shield provides means for actively pumping the oil from the radial gap to the inside of the shield seal 328 where it can be returned to the reservoir. This seal also provides means for precoating [e.g. with barrier film] to further enhance resistance to oil migration.

As shown in FIG. 3, the exclusion seal 360 is designed to work in conjunction with the radial gap, or annulus which, of course, is a itself a seal. That is, the radial gap 340 is designed to prevent the loss of fluid from the reservoir 330 through the gap which exists between the radial inward end 342 of the shield 328 and the outer surface 344 of shaft 204. According to the present invention, the axial gap which is defined between the axially upper surface of the exclusion shield 360 and the lower surface 374 of the shield 328 is specified to be smaller than the radial gap 340. In a preferred example, the radial gap is typically about 50 microns; the axial gap 370 will be set by methods to be described below to be about 15 microns or a ratio of about 3 to 1. The smaller gap 370 effectively reduces the area through which oil vapor can be transferred through evaporation from the reservoir 32A to the environment surrounding the motor. The evaporation rate of oil is therefore reduced significantly by incorporating the seal 360.

As far as the theory of operation is understood, when oil is introduced to either of the two gaps by shock, reorientation of the motor, or the like, then preferentially transfers to the axial gap 370 Since the capillary attractive force increases as gap size decreases, the resting place of the oil to be far more likely and primarily in the axial gap 370. As the seal is spun up, i.e., relative rotation between the upper conical surface 372 of seal ring 360 and lower surface 374 of seal shield 328 is achieved, centrifugal force acting on the oil in the axial gap 370 transfers the oil radially into the reservoir 330.

Typically, this transfer will happen in two stages. As rotation begins, the oil in the radial gap 340 will be transferred into the axial gap 370 typically in a few seconds. The oil in the axial gap 370 then transfers into the reservoir volume 330 due to centrifugal pumping.

In the description below of methods for setting the axial gap, the exclusion seal 360 is a ring-shaped separate component. This is done so the axial gap 370 can be adjusted independently of part size or assembly tolerance using methods to be described below. However, it should be seen that the invention would also be effective also if the exclusion seal ring 360 were part of the cone 310 or the shaft 204.

In the adjustable ring configuration described above as the preferred embodiment where the ring 360 is intended to be press fit over the shaft, the ring could be made of various metals, plastics or elastomers, the material choice being based on the desired lifetime of the material as well as ease of assembly.

A number of methods of setting the axial gap and its desired range of being notably smaller than the radial gap 340, and more specifically in the range of about 1:3, will be described below.

EXAMPLE ONE

A method of setting the axial gap would be to space a shim between the exclusion seal ring and the shield. The thickness of the shim would be equal to the desired gap. The shield 328 would be pushed onto the hub until seated in the seat 380. This would place the exclusion seal ring 360 in the desired position. The shield and shim would then be removed. The shield 328 would then be reinstalled minus the shim and fixed in place in the seat 380. The bearing would then be filled with oil, preferably using the fill-hole 350 which is radially displaced from the exclusion seal 360 to be closer to the oil reservoir 330 than the axial gap 370 of the exclusion seal. The axial gap would then trap any oil that came into contact with it from the oil filling needle. The axial gap would also immediately be effective in preventing the loss or evaporation of oil from the reservoir.

EXAMPLE TWO

An alternative method of positioning the exclusion seal ring 360 would be to position it with tooling a fixed distance from the shield mounting surface.

EXAMPLE THREE

Figure 4A:
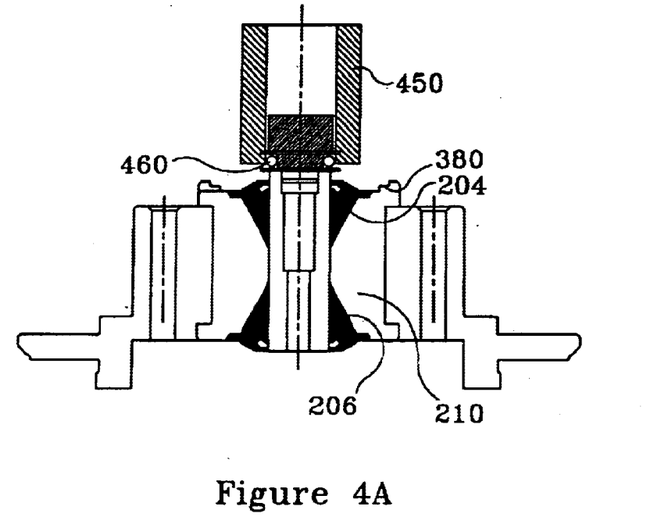
FIGS. 4A & 4B illustrates an approach to a method of positioning a ring which is used to set the axial gap in the present invention.
Figure 4B:
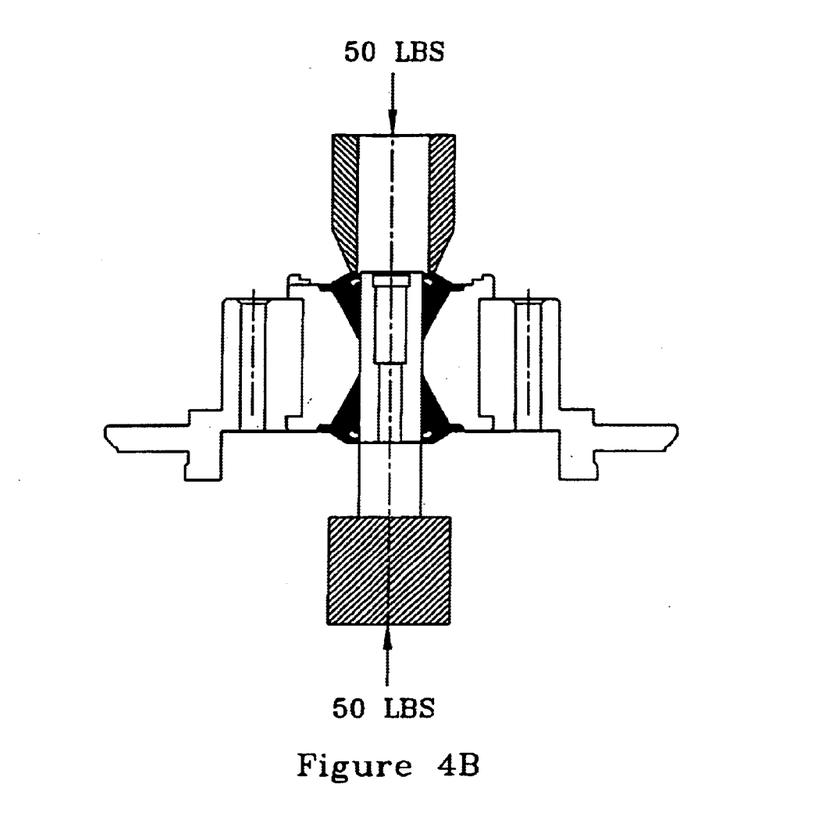

The following example will be described with reference to the illustration in FIGS. 4A & 4B. In this illustration, referring to FIG. 4A, it can be seen that this configuration is very similar in most pertinent respects to the configuration shown in FIG. 2, although the base element and certain other parts are missing. In this configuration, as is known, there is a gap between the outer surface of each cone 206, 208 and the facing surface of the hub 210. In carrying out the method of this example, as is known, the total axial play between in these two gaps is set to a desired value of about 20 μm. As a next step, the exclusion seal rings are installed, using a holding nest 450 or the like, to push rings far enough on the shaft so that they can be easily contacted when the seal shield 328 is pushed on the shaft. A cone holding nest which is used to press the cones on according to known methods could be modified to hold the exclusion seal a fixed distance from the cone, installing the shield at a distance from the cone when the cones are installed, thereby saving an extra processing step.

Next, the seal shield 328 is installed, with the shield being pressed into the seat 380 and held in place forcefully, typically about 10 pounds of force would be required to make this placement. The shields are then laser-welded in place.

Finally, the shield 328 is pressed with a substantial force (see FIG. 4B), for example, 50 pounds, at the inner diameter 460 of the shield adjacent to the shaft, while the shaft is fixedly supported at the opposite end. This pressure on the seal shield 328 moves the exclusion seal ring 360 into position, and sets the axial gap 370 to a value of about one-half of the axial play plus the deflection of the shield which amounts to about 15 microns with a 50 pound load. Depending on the friction between the exclusion seal 360 and the shaft 204, the load applied at the inner diameter of the shield can be calibrated to produce a deflection of the shield which positions the seal ring to the desired axial gap. The axial gap 370 while the motor is spinning is thereby established and the ring is fixed in place to maintain this gap.

Figure 5:
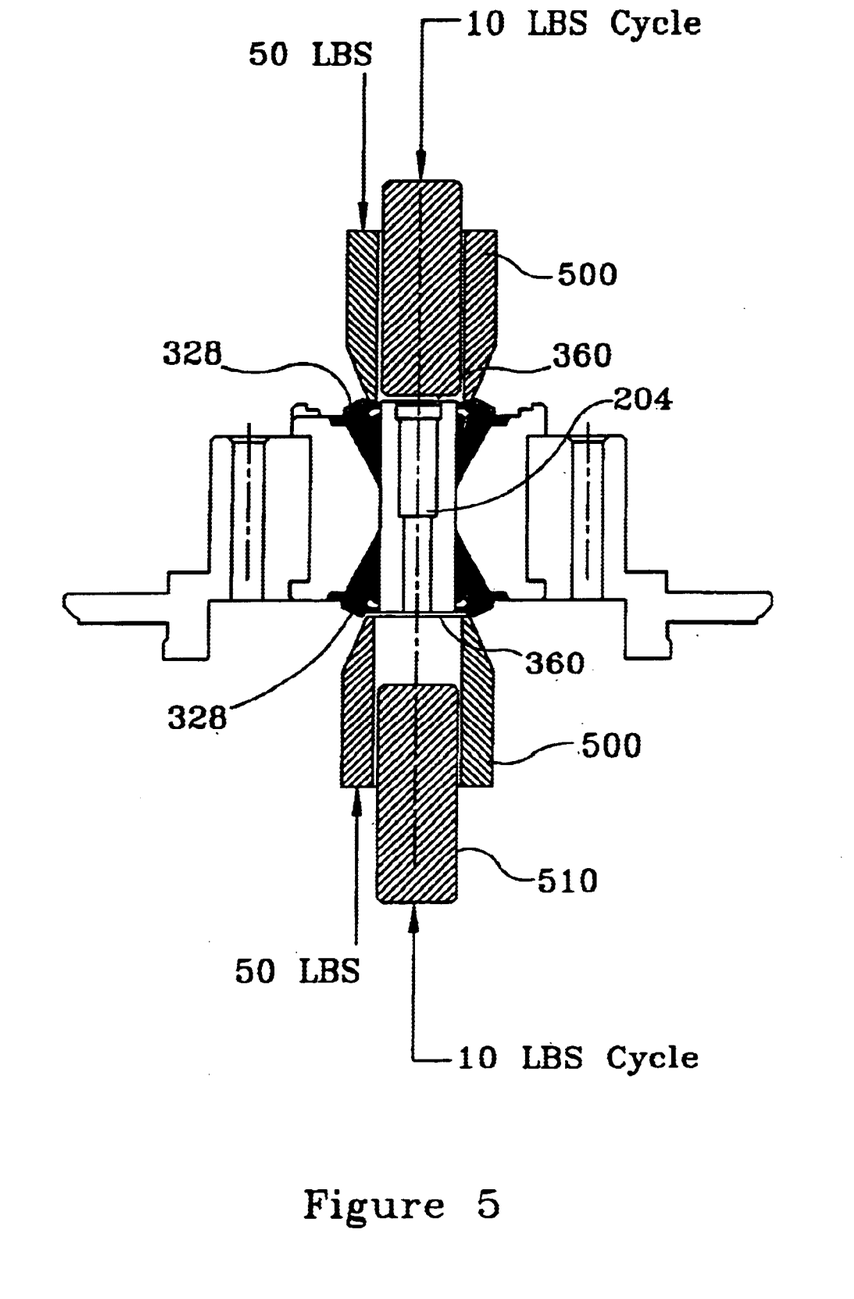
FIG. 5 illustrates an alternative method of positioning the rings which are used to establish the axial gap in the present invention.

An alternative approach which may be used to set the gaps on both ends at the same time is illustrated with respect to FIG. 5.

EXAMPLE FOUR

The approach of FIG. 5 can be used to set the gaps on both ends at the same time. The illustration of FIG. 5 shows the rings 360 already in place on the shaft axially inside of the seal shields 328 at either end. According to this approach, as shown in the figure, the shields are simultaneously held in place by a well known device 500 with a force of about 60 pounds as indicated. The shaft 204 is cycled up and down using an air actuator 510 or the like with a pressure of about plus or minus 10 pounds. This will result in an application of net force to each shield which will achieve the proper axial gap 370. Other approaches to the methods of setting the axial gaps are certainly available and viable and fall well within the scope of the invention which is to be limited only by the following claims.

While foregoing is directed to the preferred embodiment of the present invention, other and further embodiments of the invention may be devised without departing from the basic scope thereof, and the scope thereof is determined by the claims that follow.

What is claimed is:

1. An exclusion seal for a conical fluid dynamic bearing, the bearing comprising a cone near an end of a shaft mounted for rotation relative to a surrounding sleeve and hub, the cone having a first angular surface facing a surface of the sleeve and defining a gap therewith, fluid in the gap supporting relative rotation of the cone, the shaft and the surrounding sleeve, the cone further comprising a second angular surface and the hub supporting a seal shield having a surface facing the second angular surface, the shield surface and the second angular surface together defining a reservoir for maintaining fluid at an end of the gap between the cone and the sleeve so that fluid is maintained within the gap, the shield extending radially toward the shaft and defining an annulus between an end of the shield and the outer surface of the shaft, and wherein the exclusion seal comprises a surface extending substantially parallel to an inner surface of the shield and defining an axial gap which is less than the annulus, whereby the axial gap by capillary attraction limits the amount of oil which can be introduced into the radial gap.

2. An exclusion seal as claimed in claim 1 wherein the axial gap is defined by a ring including the exclusion seal surface, supported on the shaft between the cone and the shield, in fluid communication with the annulus.

3. An exclusion seal is claimed in claim 2 wherein the ratio of the annulus to the axial gap is about 3 to 1, with the axial gap being the narrower gap.

4. An exclusion seal is claimed in claim 2 wherein the seal shield includes a fill hole located between the axial gap defined by the ring and the reservoir defined by surfaces of the cone and the seal shield.

5. An exclusion seal as claimed in claim 2 wherein the axial gap is adjustable after the seal shield is fixed in place supported from the sleeve, so that the axial gap dimension relative to the radial gap may be accurately established.

6. A motor comprising a sleeve shaft and a surrounding the shaft, the shaft and sleeve being mounted for relative rotation by one or more conical fluid dynamic bearings spaced along the shaft each of the bearing comprising a cone near an end of a shaft mounted for rotation relative to the surrounding sleeve and hub, the cone having a first angular surface facing a surface of the sleeve and defining a gap therewith, fluid in the gap supporting relative rotation of the cone, the shaft and the surrounding sleeve, the cone further comprising a second angular surface and the hub supporting a seal shield having a surface facing the second angular surface, the shield surface and the second angular surface together defining a reservoir for maintaining fluid at an and of the gap between the cone and the sleeve so that fluid is maintained within the gap, the shield extending radially toward the shaft and defining an annulus between an end of the shield and the outer surface of the shaft, and an exclusion seal which comprises a surface extending substantially parallel to an inner surface of the shield and defining an axial gap which is less than the annulus, whereby the axial gap by capillary attraction limits the amount of oil which can be introduced into the radial gap.

7. A motor as claimed in claim 6 wherein the axial gap is defined by a ring including the exclusion seal surface, supported on the shaft between the cone and the shield, in fluid communication with the annulus.

8. A motor as claimed in claim 7 wherein the ratio of the annulus to the axial gap is about 3 to 1, with the axial gap being the narrower gap.

9. A motor as claimed in claim 7 wherein the seal shield includes a fill hole located between the axial gap defined by the ring and the reservoir defined by surfaces of the cone and the seal shield.

10. A motor as claimed in claim 7 wherein the axial gap is adjustable after the seal shield is fixed in place supported from the sleeve, so that the axial gap dimension relative to the radial gap may be accurately established.

11. A motor comprising a shaft and a sleeve surrounding the shaft, the shaft and sleeve being mounted for relative rotation by one or more conical fluid dynamic bearings spaced along the shaft each of the bearing comprising a cone near an end of a shaft mounted for rotation relative to a surrounding sleeve, the cone having a first angular surface facing a surface of the sleeve and defining a gap therewith, fluid in the gap supporting relative rotation of the cone, the shaft and the surrounding sleeve, and sealing means cooperating with the fluid bearing gap for preventing loss of fluid from a reservoir associated with an end of the bearing gap.

12. A motor as claimed in claim 11 wherein the cone further comprises a second angular surface and the hub supporting a shield having a surface facing the second angular surface, the shield surface and second angular surface together defining a reservoir for maintaining fluid at an end of the gap between the cone and the sleeve so that fluid is maintained within the gap, the shield extending radially toward the shaft and defining an annulus between an end of the shield and the outer surface of the shaft, and an exclusion seal which comprises a surface extending substantially parallel to an inner surface of the shield and defining an axial gap which is less than the annulus, whereby the axial gap by capillary attraction limits the amount of oil which can be introduced into the radial gap.

13. A motor as claimed in claim 12 wherein the axial gap is defined by a ring including the exclusion seal surface, supported on the shaft between the cone and the shield, in fluid communication with the annulus.

14. A motor as claimed in claim 13 wherein the ratio of the annulus to the axial gap is about 3 to 1, with the axial gap being the narrower gap.

15. A motor as claimed in claim 13 wherein the seal shield includes a fill hole located between the axial gap defined by the ring and the reservoir defined by surfaces of the cone and the seal shield.

16. A motor as claimed in claim 13 wherein the axial gap is adjustable after the seal shield is fixed in place supported from the sleeve, so that the axial gap dimension relative to the radial gap may be accurately established.

17. A method for setting an axial gap in an exclusion seal for conical fluid dynamic bearing, the bearing comprising a cone near an end of a shaft mounted for rotation relative to a surrounding sleeve and hub, the cone having a first angular surface facing a surface of the sleeve and defining a gap therewith, fluid in the gap supporting relative rotation of the cone, the shaft and the surrounding sleeve, the cone further comprising a second angular surface and the hub supporting a seal shield having a surface facing the second angular surface, the shield surface and the second angular surface together defining a reservoir for maintaining fluid at an end of the gap between the cone and the sleeve so that fluid is maintained within the gap, the shield extending radially toward the shaft and defining an annulus between an end of the shield and the outer surface of the shaft, and wherein the exclusion seal comprises a surface extending substantially parallel to an inner surface of the shield and defining an axial gap which is less than the annulus, whereby the axial gap by capillary attraction limits the amount of oil which can be introduced into the radial gap, the axial gap being defined by a ring including the exclusion seal surface, supported on the shaft between the cone and the shield, in fluid communication with the annulus, wherein setting the axial gap between the seal shield and the ring supported on the shaft comprises placing the ring on the shaft prior to placement of the seal shield on the sleeve, fixing the seal shield in place supported from the sleeve and extending over the ring, and depressing the seal shield close to an outer surface of the shaft to depress the seal shield into contact with the ring, the seal shield being displaced at the diameter of the shield closest to the shaft by about the dimension of the desired axial gap.

* * * * *